(12) United States Patent
Yuasa (10) Patent No.: US 7,180,425 B2
(45) Date of Patent: Feb. 20, 2007

(54) DROP DETECTION DEVICE OR ABNORMALITY DETECTION DEVICE AND PORTABLE APPARATUS EQUIPPED WITH SAID DEVICE

(75) Inventor: Mitsuhiro Yuasa, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 223 days.

(21) Appl. No.: 10/942,812

(22) Filed: Sep. 17, 2004

(65) Prior Publication Data

US 2005/0279165 A1 Dec. 22, 2005

(30) Foreign Application Priority Data

Sep. 18, 2003 (JP) ............................. 2003-326518

(51) Int. Cl.
*G08B 21/00* (2006.01)
(52) U.S. Cl. .................. 340/669; 340/670; 340/671; 340/686.1; 340/689; 42/66; 42/70.01; 42/70.06; 42/70.07
(58) Field of Classification Search ................ 340/669, 340/670, 671, 686.1, 689; 42/66, 70.01, 42/70.06, 70.07
See application file for complete search history.

(56) References Cited

U.S. PATENT DOCUMENTS

2003/0128475 A1* 7/2003 Wehrenberg ................ 360/250

FOREIGN PATENT DOCUMENTS

| JP | 08221886 | * | 2/1995 |
| JP | 08 221886 | | 8/1996 |
| JP | 8-221886 A | | 8/1996 |
| JP | 200241442 | * | 2/1999 |
| JP | 2000-241442 A | | 9/2000 |

OTHER PUBLICATIONS

Korean Office Action dated Jan. 27, 2006 (Three (3) pages).
Nikkel Electronics, Publication Date: Jul. 7, 2003-PP116-114 (Partial Translation).

* cited by examiner

Primary Examiner—Jeffery Hofsass
Assistant Examiner—Hongmin Fan
(74) Attorney, Agent, or Firm—Crowell & Moring LLP (57) ABSTRACT

The invention is aimed at preventing apparatus damage, loss of data, accidental firing of a firearm due to dropping or subjection to an impact, and other mishaps caused by accidental dropping or improper handling of the apparatus, firearm, etc. due to carelessness on the side of users. To achieve this, a drop detecting means is provided that detects the dropping of the apparatus when the apparatus is dropped, and control is performed so as to set the apparatus in a safe condition in response to a drop detection signal supplied by the drop detecting means.

6 Claims, 4 Drawing Sheets

DROP DETECTION DEVICE OR ABNORMALITY DETECTION DEVICE AND PORTABLE APPARATUS EQUIPPED WITH SAID DEVICE

BACKGROUND OF THE INVENTION

1. Field of the Invention

The present invention relates to a drop detection device or an abnormality detection device for a portable apparatus or like apparatus that can be carried by hand, and more particularly to a drop detection device or an abnormality detection device for protecting the apparatus against possible accidents, such as physical damage to the apparatus, corruption of information transfer, and accidental firing of the apparatus, that could occur due to an impact when the apparatus was dropped or when an abnormal acceleration force was applied to the apparatus.

2. Description of the Related Art

In recent years, portable information processing apparatuses, including portable telephones, have become smaller in size and higher in performance. Such portable electronic apparatuses may be accidentally dropped from the hand while in use and, in view of this, various means have been devised to protect critical constituent elements, i.e., printed wiring boards, of such small-size information processing apparatuses, against impact.

For example, in Nikkei Electronics, Jul. 7th, 2003, pp. 116–124, there is described a structural approach that employs a structure in which, to protect against dropping impact, the printed wiring board is held in position by means of reinforcing ribs and bosses provided on the housing, rather than fixing the wiring board with many screws. Alternatively, a method is employed that fixes the printed wiring board in place by flowing a resin called "underfill" into a gap between the package and the wring board. Further, development of impact resistant solder, etc. is under way.

As portable apparatuses such as portable telephones have come to be equipped with digital cameras, higher functionality and higher performance are demanded for their built-in cameras, calling for a further increase in the number of pixels and the introduction of such features as autofocus and optical zoom. If these features are to be implemented, driving mechanisms for camera modules will inevitably become complex.

Small-size information processing apparatuses such as portable telephones tend to be accidentally dropped or hit against a hard object while in use, because of their small size and light weight. Among others, high-functionality, high-performance camera modules, such as described above, are sensitive to impact. If the camera module is to be designed with impact resistance, the camera module must be made larger in size and heavier in weight. In particular, when the optical zoom feature is incorporated, a lens barrel holding lenses therein is extended and retracted using a cam mechanism; here, if an impact is applied when the lens barrel is in its extended position, often the impact concentrates on the cam mechanism, resulting in breakage of the cam mechanism.

To enhance the impact resistance, it is desirable from the design point of view that the apparatus be designed so that the impact applied to the housing of the camera module will be transmitted, directly to its component parts, as little as possible; for example, to alleviate the impact, impact resistance measures have been proposed, such as mounting the module in such a manner as to be isolated from the frame or protecting the module itself by an elastic member.

Memory cards are finding widespread use in many fields, because of their small size, large capacity, and high operating speed; in particular, removable memory cards are increasingly used in digital cameras, portable game machines, etc. The removable memory card has contacts for connection with an apparatus in which the card is inserted, and in many cases, plate spring-like electrodes are provided on the apparatus side and flat pads are formed on the card in order to facilitate smooth insertion and removal of the card. If such a memory card is accidentally dropped, or if an impact is applied due to a violent motion to the apparatus in which the card is inserted, the power supply may be cut momentarily, and the data being written may be corrupted or the data transfer contacts may be momentarily disconnected (contact lift), resulting an inability to write the data correctly. Accordingly, in applications where correct data transfer is demanded, the above problem is addressed, for example, by reducing the spring constant of the plate spring-like electrodes on the apparatus side, by duplicating the contacts, or by verifying the written data against the original data. Duplication of the contacts may serve to reduce the chance of contact disconnection, but cannot definitely reduce the chance to zero; besides, the duplication involves the problem of increased cost and increased size. On the other hand, the verifying approach entails a reduction in effective write speed and an increase in power consumption. The solutions so far described are approaches from the viewpoint of structure and material.

In technical fields other than the information apparatus field described above, there are also cases where the handling of an apparatus that tends to be dropped accidentally or subjected to an abnormal acceleration force can pose a problem. Portable firearms are an example of such apparatus. For example, when one is using a rifle or the like, one may accidentally drop the rifle or may swing the rifle beyond the tolerable limit specified in the method of use; here, when the rifle is dropped, or when the rifle is subjected to an abnormal impact, the trigger of the rifle may be hit by an object at the spot where the rifle is dropped, causing accidental firing of the rifle. Such accidental firing has long been a problem.

SUMMARY OF THE INVENTION

As described above, apparatus damage, loss of data, accidental firing of a firearm due to dropping or subjection to an impact, and other mishaps caused by accidental dropping or improper handling of the apparatus, firearm, etc. due to carelessness on the side of users, have been serious problems for the users, and there has been a demand to develop techniques for avoiding, alleviating, or solving such problems.

In view of the above situation, it is an object of the present invention to prevent the above problems from occurring, by making provisions to detect in advance the possible breakage/damage or accidental firing of an apparatus that can occur due to an impact when the apparatus or the apparatus body is dropped or due to an impact, etc. resulting from improper handling thereof, and to protect the apparatus or the apparatus body against such accidents by setting the apparatus or the apparatus body in a safe condition ahead of time.

In its broadest aspect, the invention concerns a drop detection device comprising at least an acceleration sensor and a drop determining means for outputting a drop detection signal.

More specifically, the drop detection device includes: the acceleration sensor; a means for calculating acceleration in the direction of gravity, based on an output of the acceleration sensor; a means for counting, when a weightless acceleration is detected, the duration of time that the weightless acceleration continues; and the drop determining means which compares an output of the time counting means with a predetermined value and, if the output is equal to or greater than the predetermined value, then outputs the drop detection signal after determining that a drop is occurring.

In a preferred embodiment of the invention, the drop detection device is a circuit implemented on a single chip.

More specifically, in the preferred embodiment of the invention, at least part of the drop detection signal generating means, excluding the acceleration sensor, and the acceleration sensor are each implemented on a single chip.

It is preferred that the acceleration sensor is a three-axis acceleration sensor.

It is more preferred that the three-axis acceleration sensor is a piezoresistive three-axis acceleration sensor.

Another embodiment of the invention concerns an abnormality detection device comprising: an abnormality detecting means having: an acceleration sensor, a calculating means for calculating the magnitude of acceleration from an output of the acceleration sensor, and a comparing means for comparing the magnitude with a predetermined magnitude and, if the output of the acceleration sensor is greater than the predetermined magnitude, then generating an abnormality detection signal; and a drop detecting means having: an acceleration sensor, a means for calculating acceleration in the direction of gravity based on an output of the acceleration sensor, a means for counting, when a weightless acceleration is detected, the duration of time that the weightless acceleration continues, and a drop determining means for comparing an output of the time counting means with a predetermined value and, if the output is equal to or greater than the predetermined value, then outputting a drop detection signal by determining that a drop is occurring.

An embodiment of the invention concerns an abnormality detection device comprising: an acceleration sensor; a velocity calculating means for calculating apparatus velocity from an output of the acceleration sensor; and a comparing means for comparing an output of the velocity calculating means with a predetermined numerical value and, if the output of the velocity calculating means is greater than the predetermined numerical value, then outputting an abnormality detection signal.

An example of the invention concerns a digital camera having: a drop detection device, as claimed in any one of claims 1 to 6, or an abnormality detection device, as claimed in claim 7 or 8, mounted on a circuit board; and a control device for causing a lens barrel to retract back into a housing position in response to the signal output from the detecting means.

A more specific example of the invention concerns a digital camera as claimed in claim 9, wherein control is performed by passing a large electric current so as to retract the lens barrel at high speed.

Another example of the invention concerns a memory card having a control device which performs control so as to suspend the transfer of any signal being transferred for storing in the memory card, upon receiving a signal from a drop detection device or from an abnormality detection device as described above.

Another example of the invention concerns an apparatus holding a memory card therein and equipped with a drop detection device or an abnormality detection device as described above, the apparatus having a control device which performs control so as to suspend the transfer of any signal being transferred for storing in the memory card, upon receiving the signal from the drop detection device.

Another example of the invention concerns a firearm equipped with a drop detection device or an abnormality detection device as described above, the firearm having a control device which performs control so as to activate a safety device of the firearm upon receiving the signal from the drop detection device, thereby preventing accidental firing of the firearm.

When the invention is used in a firearm equipped with a drop detection device or an abnormality detection device it is preferred that the drop detection device is put in an operable condition only when a manual safety device is unlocked.

It is preferred that the safety device of the firearm is forcefully locked when remaining battery capacity in the drop detection device is zero.

According to the present invention, when an apparatus is dropped, the apparatus can be set in a safe condition ahead of time by detecting that the apparatus is dropping or being thrown; thus, the device of the invention can protect the apparatus or data or prevent accidental firing by setting the apparatus in a safe condition ahead of time, and offers a great advantage to the public. Further, the device of the invention is simple in both configuration and control.

BRIEF DESCRIPTION OF THE DRAWINGS

The above object and features of the present invention will be more apparent from the following description of the preferred embodiment with reference to the accompanying drawings, wherein.

DESCRIPTION OF THE PREFERRED EMBODIMENTS

Figure 1:
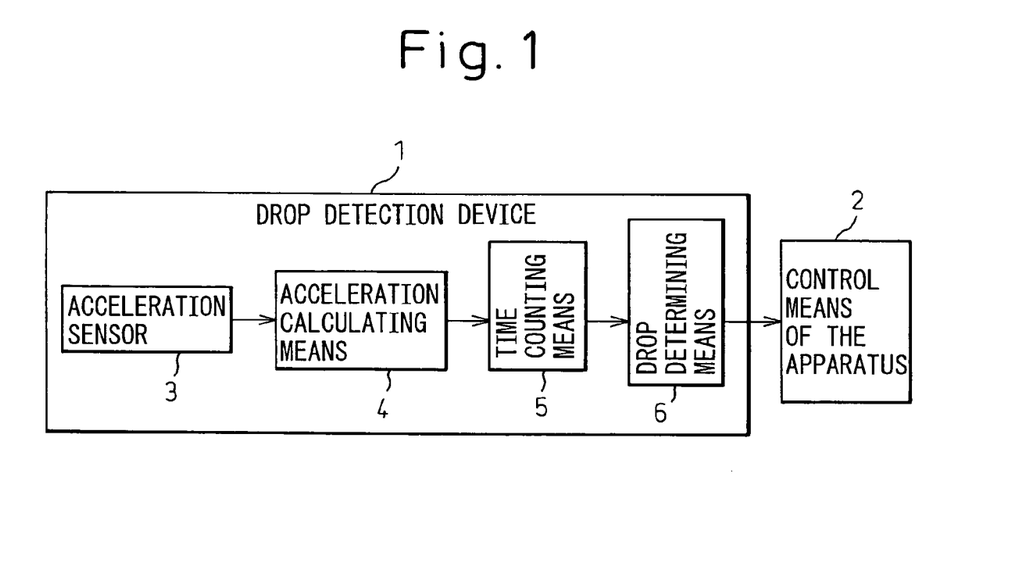
FIG. 1 is a block diagram of a drop detection device according to the present invention.

First, a description will be given of a drop detection device 1 according to a first invention of the present invention. FIG. 1 is a block diagram showing the configuration of the drop detection device 1.

(Drop Detection Device 1)

The drop detection device 1 is mounted in a portable or hand-held apparatus. The drop detection device 1 detects in advance the possible breakage/damage of the apparatus that can occur due to an impact, etc. when the apparatus is dropped. The output of the detection is fed to a control means 2 of the apparatus, and control is performed so as to set the apparatus in a safe condition ahead of time. The present invention is aimed at preventing the occurrence of the earlier described problems.

(Autofocus Digital Camera Equipped with Optical Zoom Mechanism)

To facilitate an understanding of the present invention, a description will be given by taking as an example an autofocus digital camera equipped with an optical zoom mechanism.

Here, assume a situation where the camera, in use and with its zoom lens barrel extended, is accidentally dropped. When the camera begins to drop, the drop detection device 1 detects the dropping of the apparatus, and generates a drop detection signal, which is sent to the control means 2 of the apparatus. Upon reception of the drop detection signal, the control means 2 generates a barrel retract command signal and sends it to the control section of the zoom mechanism, to set the apparatus in a safe condition. With this processing, as the zoom lens barrel is retracted before the camera hits the ground, damage can be avoided or alleviated. An overview of the present invention has been given above by taking as an example an autofocus digital camera equipped with an optical zoom mechanism, but it is apparent that the present invention is not limited to a camera having a zoom mechanism, but can be applied to any camera of the type that has an extendable lens barrel. A detailed description will be given below.

(Drop Detection Device 1)

FIG. 1 is a block diagram showing the configuration of the drop detection device 1.

The drop detection device 1 comprises an acceleration sensor 3, a acceleration calculating means 4, a time counting means 5, and a drop determining means 6.

The acceleration sensor 3 can make use of a commercially available sensor that measures accelerations in three axes, and constantly detects the acceleration. When the apparatus is at rest, 1 G (G is the acceleration due to gravity) is detected for the component in the direction of gravity (in the z-axis direction). When acceleration acts on the apparatus, the acceleration acting on it is calculated. In particular, when the apparatus is dropping, the acceleration sensor 3 detects 0 G (weightlessness).

The acceleration calculating means 4 obtains accelerations in three axis directions from the acceleration sensor 3, and calculates the acceleration by combining them vectorially. Next, a comparison is made to determine whether, of the accelerations detected by the acceleration sensor 3, the acceleration in the direction of gravity (in the z-axis direction) is zero or not. If it is determined based on the result of the comparison that the acceleration in the direction of gravity is zero (weightlessness), a command is issued to the time counting means at the next stage to start counting the duration of time that the weightlessness continues.

The time counting means 5 counts the duration of the weightlessness by using the clock of the CPU (or the clock from a clock generator not shown).

Next, the drop determining means 6 compares the time duration with a preset value and, if the time duration is larger than the preset value, generates a drop detection signal by determining that the apparatus is dropping. Here, the preset time is the time within which, by design, an impact due to dropping is not likely to affect the apparatus.

The thus generated drop detection signal is passed to the control means 2 of the apparatus, as earlier described.

The above has described the configuration and operation of the drop detection device 1. The signal from the drop detection device 1 is used as a control signal to the control means 2 of the apparatus.

Figure 11:
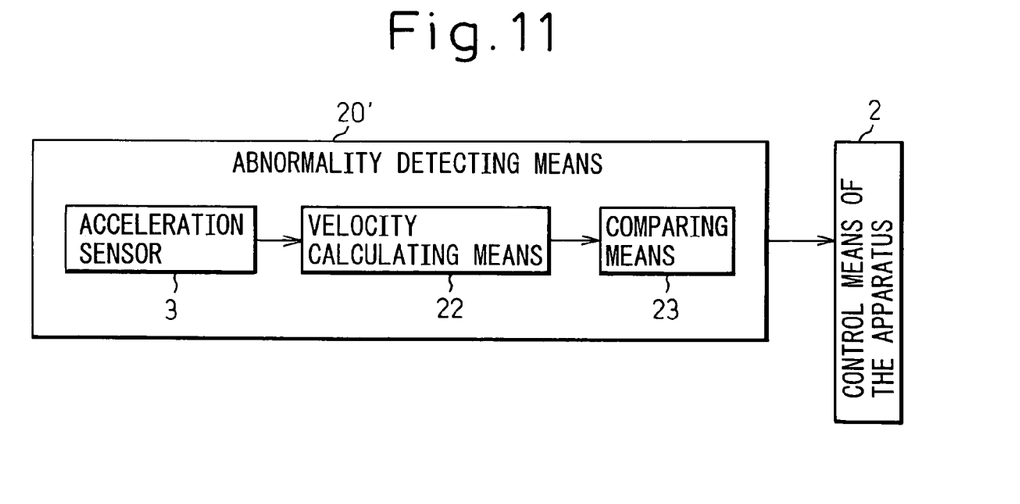
FIG. 11 is a block diagram of a second abnormality detecting means.

In an alternative method, a velocity calculating means 22, which will be described later, calculates the velocity from the detected acceleration, and a comparing means 23 compares the velocity of the apparatus with a predefined velocity and, if it exceeds the predefined velocity, generates an abnormality signal. In this case, if weightlessness is detected, the velocity is calculated by assuming that the acceleration in the direction of gravity, −g, is acting.

The drop detection device 1 is implemented on a single chip to reduce the mounting area and the weight, and is mounted in the apparatus housing the circuit, that is, in the body of the apparatus to which the present invention is applied. In particular, it is desirable that the drop detection device be placed at a position where the acceleration of the apparatus can be easily measured of course, the drop detection device or part of it may be connected as an external module.

The acceleration calculating means 4, the time counting means 5, and the drop determining means 6 are each implemented in software by using the CPU, but may be implemented as a circuit by using hardware.

In the case of a camera, for example, the drop detection device is mounted on the circuit board of the camera module, at a position suitable for detecting the acceleration.

In the case of a memory card, on the other hand, the drop detection device may be mounted on a portion of the circuit board of the apparatus that accommodates the memory card. In this case, the apparatus equipped with the drop detection device is the apparatus that accommodates the memory card. In the case of a memory card specially designed to detect dropping, the drop detection device can be incorporated into the memory card itself. In the case of a gun, the drop detection device can be mounted on a circuit board or in the gunstock.

In the above example, the drop detection device 1 has been described as being implemented on a single chip, but alternatively, part of the drop detection device 1, excluding the acceleration sensor 3, and the acceleration sensor 3 may each be implemented on a single chip, or the acceleration sensor 3, the acceleration calculating means 4, the time counting means 5, and the drop determining means 6, which together form the drop detection device 1, may each be constructed as a separate device.

Further, when implementing the drop detection device on a single chip, its functional elements may be individually mounted on the same die, or may be packaged into one chip.

(Acceleration Sensor)

Figure 2:
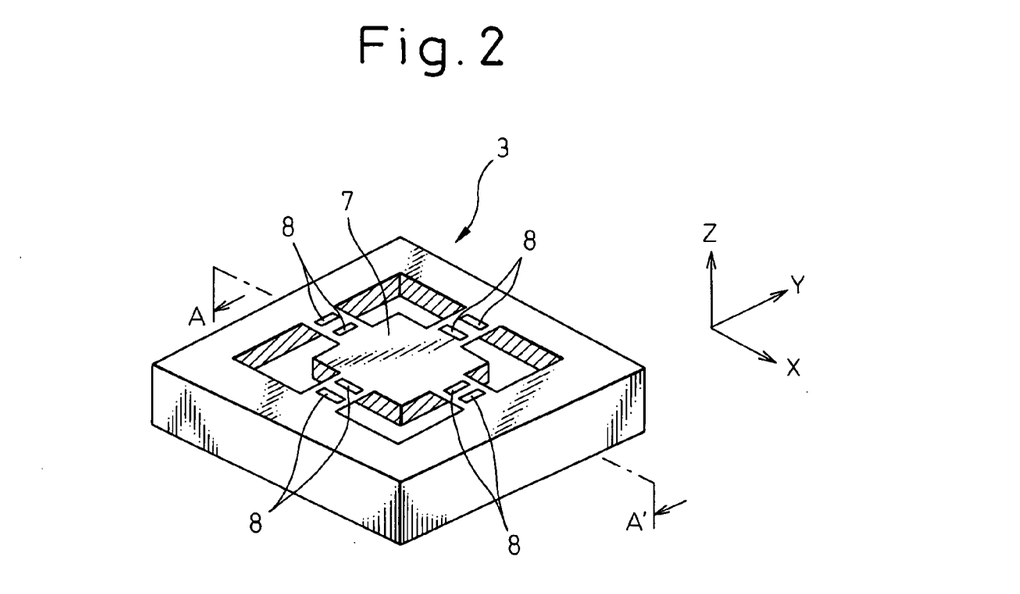
FIG. 2 is a perspective view showing the basic structure of a piezoresistive three-axis acceleration sensor 3.

Next, a description will be given of the acceleration sensor 3 which is an essential constituent element of the present invention. An acceleration sensor that detects accelerations in three axis directions simultaneously is commercially produced as a single-chip device and available for use as the acceleration sensor 3.

FIG. 2 shows a perspective view of a piezoresistive three-axis acceleration sensor 3. The sensor 3 comprises piezoresistive elements 8 housed in a package measuring, for example, 5 mm×5 mm×1.2 mm, and is designed to simultaneously detect the accelerations in the three axis directions x, y, and z, by utilizing changes in the resistances of the elements on a single chip. The piezoresistive elements 8 are formed on the upper surfaces of the bridges connecting between a center portion 7 and the respective sides in the figure. Line A–A' indicates the line that cuts the center portion 7 of the sensor 3 along the x-axis direction.

Figure 3:
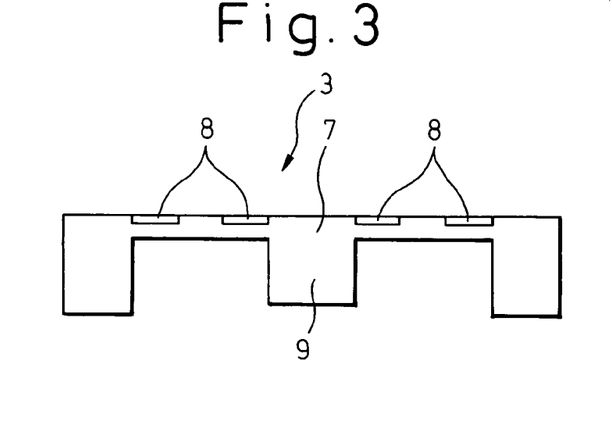
FIG. 3 is a cross-sectional view of a sensor 3 taken along line A–A' in FIG. 2.

FIG. 3 is a cross-sectional view taken along the cutting line A–A' in FIG. 2. The center portion 7 has a weight 9 protruding downward.

In the above structure, when a force F due to acceleration is applied to the elements, the sensor 3 is deformed by the movement of the weight 9, and a stress σ proportional to the acceleration is generated in the sensor 3, causing the resistance values R of the piezoresistive elements 8 to change in proportion to the stress σ.

Figure 4:
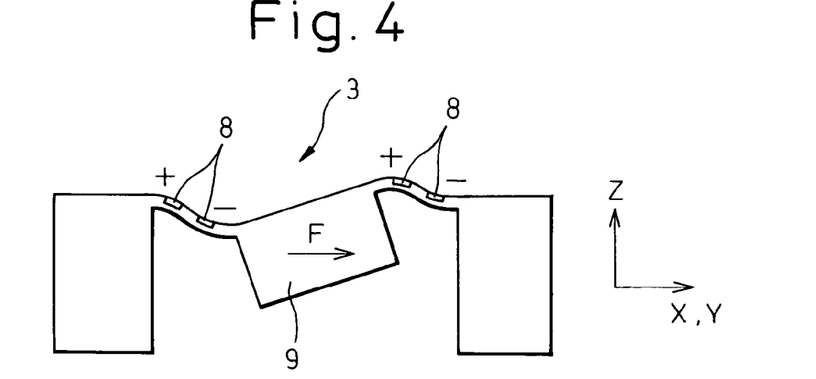
FIG. 4 is a cross-sectional view showing how the sensor 3 deforms when acceleration is applied in the x-axis or the y-axis direction in FIG. 3.

FIG. 4 is a schematic diagram showing the deformation of the sensor when a force is applied in the x or the y direction in the two-dimensional plane of the sensor surface. Accelerations αx and αy in the x and the y directions are thus detected.

Figure 5:
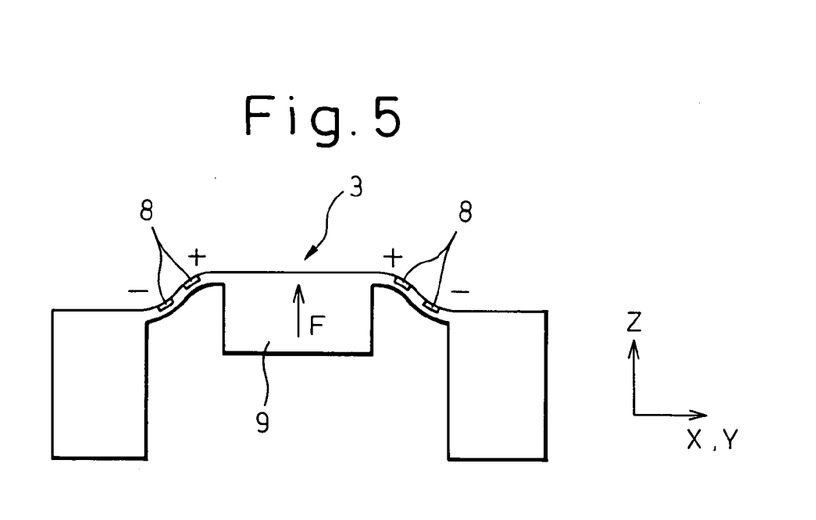
FIG. 5 is a cross-sectional view showing how the sensor 3 deforms when acceleration is applied in the z-axis direction in FIG. 3.

On the other hand, FIG. 5 is a schematic diagram showing the deformation of the sensor 3 when a force is applied in the z direction perpendicular to the surface of the sensor 3. By forming a bridge circuit (not shown) using the four sets of piezoresistive elements 8, an unbalanced voltage is detected, thereby detecting the acceleration αz.

As described above, the three-axis acceleration sensor 3 generates the signals αx, αy, and αz representing the accelerations in the x, y, and z directions, respectively.

(Application Examples)

Application examples of the drop detection device 1 will be described next.

(1) Digital Camera Equipped with Optical Zoom

When a digital camera equipped with optical zoom is in a condition with its lens barrel extended, if the user accidentally drops the camera on the ground, an impact is applied, as previously described, to the cam portion that works to extend the lens barrel, and the cam may break. To avoid this, the lens barrel must be retracted into the camera body so that the impact will be applied to the entire camera body, thus reducing the impact applied specifically to the lens barrel.

The present invention aims at protecting the zoom mechanism by quickly retracting the zoom lens barrel upon detecting the dropping of the camera. While the above description has been given by taking as an example a camera equipped with an optical zoom mechanism, it will be appreciated that the present invention can be applied to any camera of the type that has an extendable lens barrel.

Figure 6:
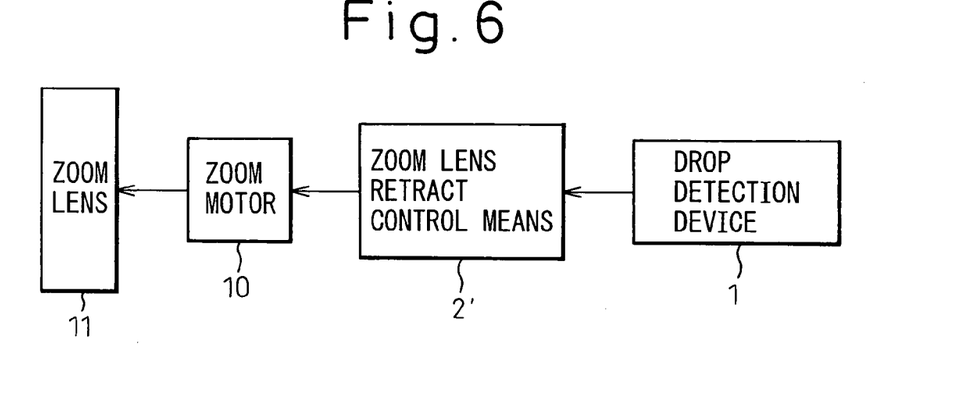
FIG. 6 is a block diagram of a zoom mechanism in a digital camera to which the present invention is applied.

To achieve this, the drop detection device 1 of the present invention is mounted on the circuit board of the camera, and performs control so as to retract the optical zoom lens barrel upon detecting the dropping of the camera. This control is implemented using a known control method. Considering that the duration of time of dropping is short, the control must be performed to retract the lens barrel at high speed by passing a particularly large electric current upon detecting the dropping of the camera.

FIG. 6 is a block diagram showing the configuration of a digital camera for the zoom and autofocus sections. In this example, the drop detection device 1 generates a drop detection signal upon detecting the dropping of the camera, and sends it to a zoom lens retract control means 2'. In response to the drop detection signal, the control means 2' drives a zoom motor 10 to retract the zoom lens 11. The previously described means 4, 5, and 6 of the drop control device may be implemented as part of the control CPU that controls the entire operation of the camera.

In this way, by switching the camera into the impact resistant mode before the camera is damaged by impact, the camera can be protected against impact. It will be recognized here that the present invention is not limited in application to digital cameras.

(2) Memory Card

Next, referring to FIG. 6, a description will be given of a situation where data is being transferred to a memory card.

Upon detecting the dropping of the apparatus, the drop detection device 1 for the memory card performs control by issuing a transfer stop instruction to a data transfer control device 2". Then, after the condition has stabilized, the transfer is resumed. This prevents error-containing data from being transferred, and serves to enhance the reliability of data writing.

In a portable apparatus such as a PDA, digital camera, or portable telephone, data corruption can be prevented if the apparatus is accidentally dropped when text data or image data is being transferred to the attached memory card.

When incorporating the drop detection device 1 of the present invention, the drop detection device 1 may be built into the apparatus in which the card is inserted, or may be built in.

Figure 7:
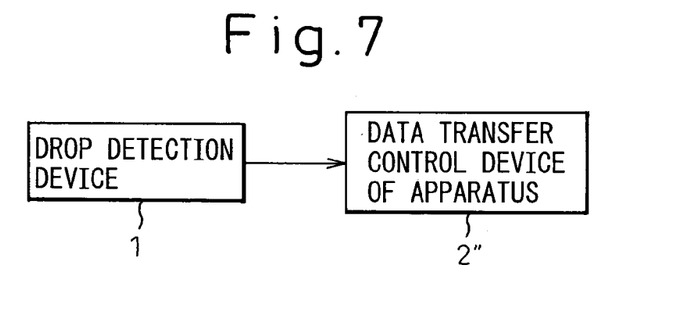
FIG. 7 is a data transfer control block diagram for a memory card accepting apparatus to which the present invention is applied.

FIG. 7 shows the signal flow from the drop detection device 1 to the apparatus in which the card is inserted, or built in.

Figure 8:
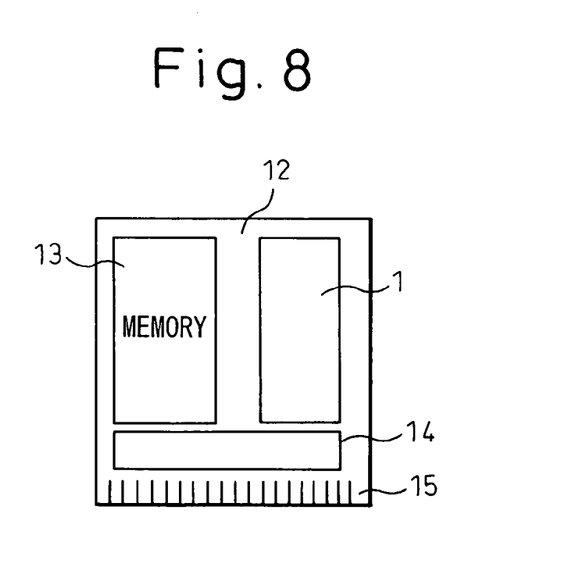
FIG. 8 shows the structure of the memory card to which the present invention is applied.

Alternatively, the drop detection device 1 may be incorporated into the card 12, as shown in FIG. 8. When incorporating it into the card 12, the drop detection device 1 can be mounted, for example, as shown in FIG. 8, by sacrificing a portion of the memory mounting area of the card 12. When the dropping of the card 12 is detected, a busy signal is issued to stop the data transfer being executed. For example, in the case of a Compact Flash, pin 37 can be used since this pin is specified as a pin that transmits the busy signal. In FIG. 8, reference numeral 14 designates an R/W control circuit, and 15 represents the pins.

Further, when mounting the drop detection device 1 on the memory card 18, if an interface means is mounted that performs control such as data write interrupt, rewrite, partial verify, file-by-file verify, etc., an new intelligent memory card implementing these control functions can be achieved.

Further, there is the possibility that the power supply contacts may come off, but this problem can be solved by incorporating a large capacitance capacitor into the card 18.

In the case of such an intelligent card, there is no need to provide a protection device in the apparatus; accordingly, the apparatus construction can be simplified and standardized by providing a choice of memory cards according to the degree of write reliability.

(3) Rifle

Figure 9:
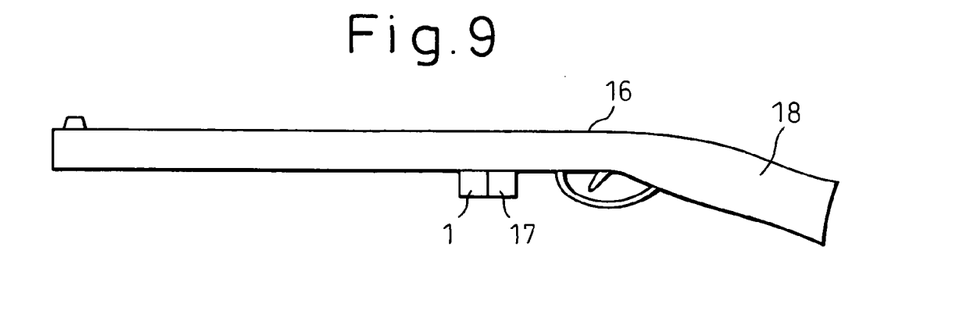
FIG. 9 is an external view of a rifle to which the present invention is applied.

FIG. 9 shows a gun 16 incorporating the drop detection device 1 of the present invention. The gun 16 is equipped with a safety device 17 for locking the trigger mechanism. When the trigger is locked by the safety device 17, the trigger cannot be pulled unless the safety device 17 is unlocked (Japanese Unexamined Patent Publication Nos. H10-220993 and 2002-501606). When the dropping of the gun is detected, the drop detection device 1 performs control so as to lock the safety device 17. In the example of FIG. 8, the drop detection device 1 is mounted near the safety device 17, but alternatively, the drop detection device 1 may be mounted in the gunstock 18. Of course, a battery must be provided to operate these electronic devices.

In the case of a gun equipped with a manual safety device, the battery consumption can be reduced if the drop detection device is made to operate only when the safety device is unlocked. Further, for safety, a measuring device for measuring the remaining capacity of the battery should be provided, with provisions made so that control is performed so as to forcefully lock the safety device when the measuring device has detected that the remaining capacity of the battery is zero.

The above description has dealt with the processing in which, when the apparatus is dropped, control is performed so as to set the apparatus in a safe condition before it hits the ground, but there are also cases where the apparatus is accidentally bumped against a hard object, for example, when the apparatus is thrown by mistake or subjected to an abruptly changing abnormal motion. In such cases also, when an unusually large acceleration is detected by the acceleration sensor 3, processing is performed to set the apparatus in a safe condition, as in the case of dropping, so that the possible damage, accidents, etc. of the apparatus can be prevented.

Figure 10:
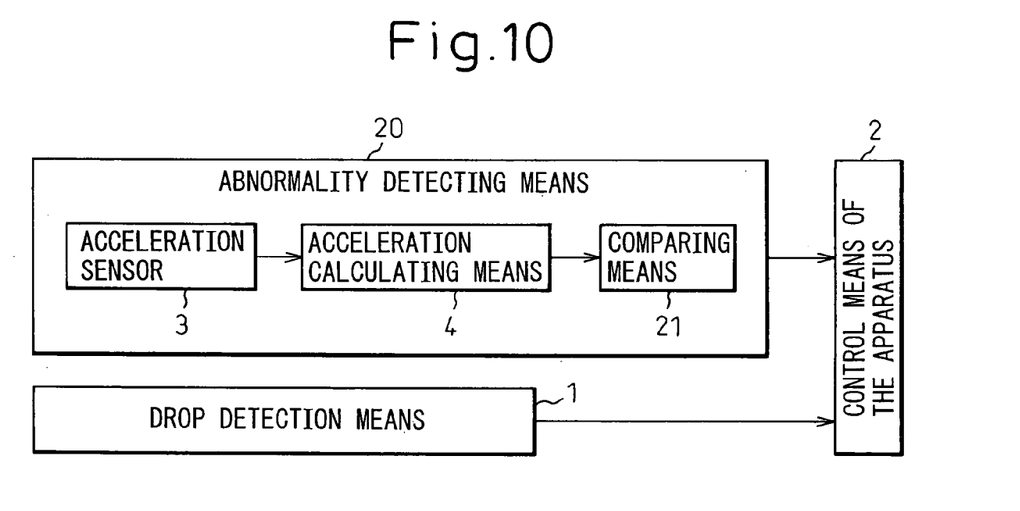
FIG. 10 is a block diagram of a drop detecting means and an abnormality detecting means.

To achieve this, an abnormality detecting means 26 should be provided in addition to the drop detection device 1, as shown in FIG. 10. The abnormality detecting means 26 comprises an acceleration calculating means 4' for summing the accelerations detected by the acceleration sensor 3, and a comparing means 21 for comparing the magnitude of the resultant acceleration with a predetermined numerical value, and for outputting an abnormality signal when it is determined that the magnitude of the resultant acceleration is greater than the predetermined magnitude. When the abnormality signal is received from the comparing means 21, the control means 2 of the apparatus controls the apparatus in a safe condition. The abnormality detecting means 20 can perform the processing by using the acceleration sensor 3, which is shared with a drop detecting means 1' (identical to the drop detection device 1), and the CPU used by the previously described means 4, 5, and 6.

In particular, in the case of a memory card, the reliability of data writing can be enhanced by performing control such as data write interrupt, rewrite, partial verify, file-by-file verify, etc. upon detecting an acceleration equal to or greater than the level that causes a contact lift before interrupting the writing.

The drop detecting means 1' may be combined with the abnormality detecting means 20 as shown in FIG. 11, in which the velocity calculating means 22 calculates the velocity from the detected acceleration, and the comparing means 23 compares the velocity of the apparatus with a predefined velocity and, if it exceeds the predefined velocity, generates an abnormality signal. In this case, if weightlessness is detected, the velocity is calculated by assuming that the acceleration in the direction of gravity, −g, is acting.

Of course, as would be apparent to those skilled in the art, instead of the drop detection device, the abnormality detection device can be incorporated in a digital camera, a memory card, an apparatus holding a memory card, a firearm equipped with a safety device, etc.

The processing flow of the CPU used by the respective means 4, 5, and 6 of the drop detection device 1 may be initiated at every predetermined time intervals (i.e., periodically), or a capacitive switch may be provided in the apparatus so that the flow is initiated by detecting the apparatus leaving the hand.

This processing can be implemented using either a microprocessor or discrete functional circuits. Further, the flow is only one example, and the present invention is not limited to this particular example.

Further, the drop detection device should be designed so as not to be activated in a short-duration dropping condition, such as when a person descends stairs.

[Potential for Exploitation in Industry]

As described above, the drop detection device of the invention can be used as a device for preventing damage to a portable apparatus, corruption of data, accidental firing of a firearm, etc.

What is claimed is:

1. A memory card having a control device which performs control so as to suspend the transfer of any signal being transferred for storing in said memory card, upon receiving a signal from a drop detection device, wherein said drop detection device includes: an acceleration sensor; a means for calculating acceleration in the direction of gravity, based on an output of said acceleration sensor; a means for counting, when a weightless acceleration is detected, the duration of time that said weightless acceleration continues; and a drop determining means, which compares an output of said counting means with a predetermined value and, if said output is equal to or greater than said predetermined value, then outputs said drop detection signal by determining that a drop is occurring.

2. A memory card having a control device which performs control so as to suspend the transfer of any signal being transferred for storing in said memory card, upon receiving a signal from an abnormality detection device comprising:

an abnormality detecting means having an acceleration sensor;

a calculating means for calculating the magnitude of acceleration from an output of said acceleration sensor; and a comparing means for comparing said magnitude with a predetermined magnitude and, if the output of said acceleration sensor is greater than said predetermined magnitude, then generating an abnormality detection signal; and a drop detection device having: an acceleration sensor; a means for calculating acceleration in the direction of gravity, based on an output of said acceleration sensor; a means for counting, when a weightless acceleration is detected, the duration of time that said weightless acceleration continues; and a drop determining means for comparing an output of said counting means with a predetermined value and, if said output is equal to or greater than said predetermined value, then outputting a drop detection signal by determining that a drop is occurring.

3. An apparatus holding a memory card therein and equipped with a device, as claimed in claim 1 or 2, said apparatus having a control device which performs control so as to suspend the transfer of any signal being transferred for storing in said memory card, upon receiving the signal from said drop detection device or said abnormality detection device.

4. A firearm equipped with a drop detection device, wherein said drop detective device includes: an acceleration sensor; a means for calculating acceleration in the direction of gravity, based on an output of said acceleration sensor; a means for counting, when a weightless acceleration is detected, the duration of time that said weightless acceleration continues; and a drop determining means, which compares an output of said counting means with a predetermined value and, if said output is equal to or greater than said predetermined value, then outputs said drop detection signal by determining that dropping is occurring, said firearm having a control device which performs control so as to activate a safety device of said firearm upon receiving the signal from said drop detection device, thereby preventing accidental firing of said firearm, wherein said safety device is forcefully locked when a remaining battery capacity in said drop detection device is zero.

5. A firearm equipped with an abnormality detection device comprising:
   an abnormality detecting means having: an acceleration sensor; a calculating means for calculating the magnitude of acceleration from an output of said acceleration sensor; and a comparing means for comparing said magnitude with a predetermined magnitude and, if the output of said acceleration sensor is greater than said predetermined magnitude, then generating an abnormality detection signal; and
   a drop detecting means having: an acceleration sensor; a means for calculating acceleration in the direction of gravity, based on an output of said acceleration sensor; a means for counting, when a weightless acceleration is detected, the duration of time that said weightless acceleration continues; and a drop determining means for comparing an output of said counting means with a predetermined value and, if said output is equal to or greater than said predetermined value, then outputting a drop detection signal by determining that dropping is occurring,
   said firearm having a control device which performs control so as to activate a safety device of said firearm upon receiving the signal from said drop detecting means, thereby preventing accidental firing of said firearm, wherein said safety device is forcefully locked when the remaining battery capacity in said drop detection device is zero.

6. A firearm equipped with an abnormality detection device comprising: an acceleration sensor; a velocity calculating means for calculating apparatus velocity from an output of said acceleration sensor; and a comparing means for comparing an output of said velocity calculating means with a predetermined numerical value and, if the output of said velocity calculating means is greater than said predetermined numerical value, then outputting an abnormality detection signal, said firearm having a control device which performs control so as to activate a safety device of said firearm upon receiving the signal from said abnormality detection device, thereby preventing accidental firing of said firearm, wherein said safety device is forcefully locked when a remaining battery capacity in said abnormality detection device is zero.

* * * * *